US006885497B1

United States Patent
Monroe

(10) Patent No.: US 6,885,497 B1
(45) Date of Patent: Apr. 26, 2005

(54) LASER METHOD AND APPARATUS

(75) Inventor: John N. Monroe, Mansfield, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 04/520,821

(22) Filed: Dec. 20, 1965

Related U.S. Application Data

(63) Continuation-in-part of application No. 04/474,207, filed on Jul. 16, 1965, now abandoned.

(51) Int. Cl.$^7$ .................................................. H01S 3/00

(52) U.S. Cl. ........................ 359/333; 359/285; 359/305

(58) Field of Search ........................ 331/94.5; 250/199; 359/285–305, 333; 372/95, 24, 26, 101

(56) References Cited

U.S. PATENT DOCUMENTS

| | | | |
|---|---|---|---|
| 3,111,587 A | * 11/1963 | Rocard | 250/199 |
| 3,292,102 A | * 12/1966 | Byrne | 331/94.5 |
| 3,353,115 A | * 11/1967 | Maiman | 331/94.5 |

OTHER PUBLICATIONS

Gurs, *Das Schwingungsver–halten von optischen Rubin--Masern mit grossem spiegelabstand*, in Z. Naturforschg, vol. 17A, Nov. 1962, Q3Z4, pp 990–993 relied on.*

* cited by examiner

*Primary Examiner*—Nelson Moskowitz
(74) *Attorney, Agent, or Firm*—Sidley Austin Brown & Wood LLP; Stephen S. Sadacca

(57) ABSTRACT

A single-ended laser device for locating reflective targets within a given surveillance volume, said apparatus comprising:

a body of material excitable to emit electromagnetic radiation at frequencies within a characteristic fluorescence peak, said body having an effective exit aperture;

a single retro-reflective member having an optic center and positioned to receive radiation from said body and to redirect said radiation into said surveillance volume through said effective exit aperture of said body, said effective aperture being oppositely disposed on said body from said single member, said single member cooperating with said body to form a field of view within said surveillance volume substantially equal to the solid angle defined by the square of the length of a line joining said optic center of said single member with the center of said effective exit aperture divided into the area of said exit aperture transverse to said line;

means for exciting said body to an energy level substantially equal to the threshold for establishing oscillation of stimulated radiation between said single member and a reflective target located a preselected maximum distance from said single member to cause said body to broadcast fluorescent radiation throughout said field of view, whereby a resonant beam of stimulated radiation will be established between said single member and a reflective target located anywhere within said field of view at not more than said maximum distance and which is oriented to receive radiation from said body and to redirect said radiation through said body to said single member; and means for indicating establishment of said resonant beam.

7 Claims, 2 Drawing Sheets

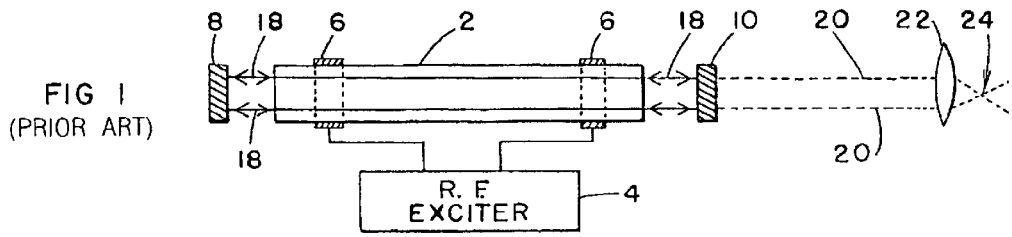
FIG 1
(PRIOR ART)
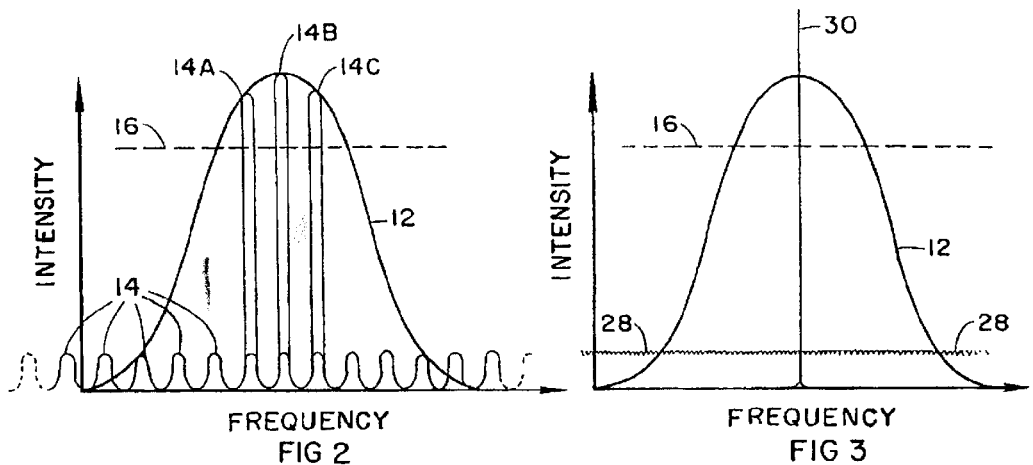
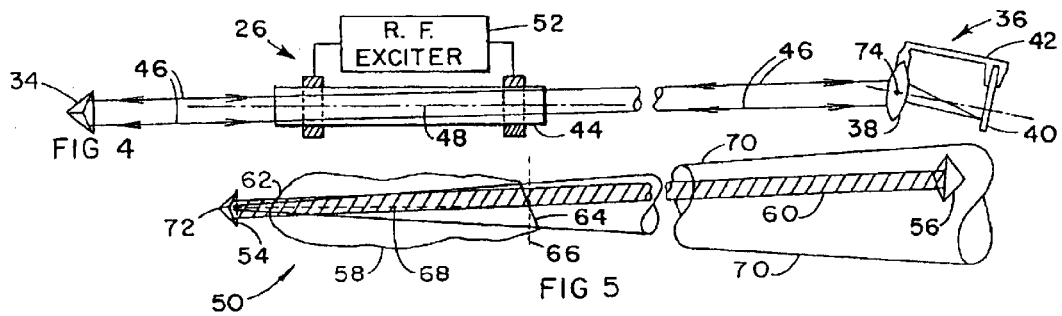
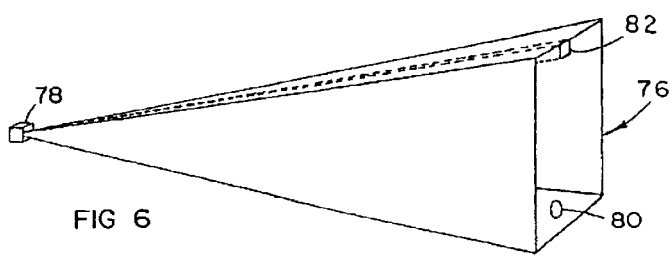

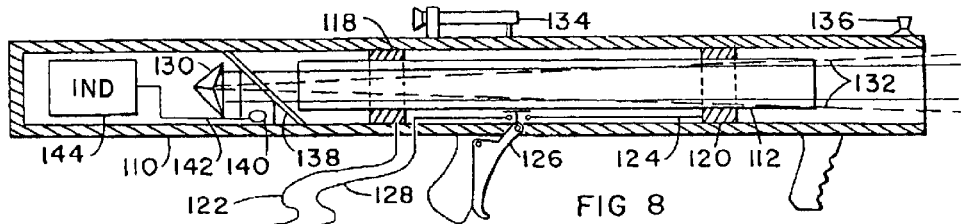
FIG 8
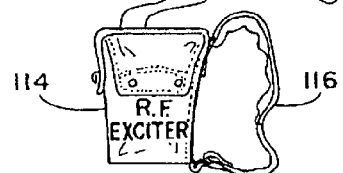
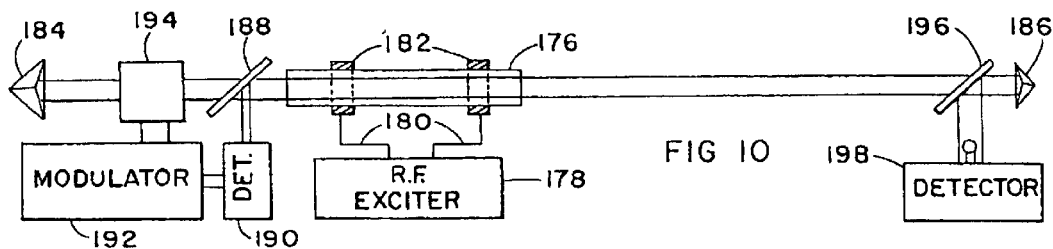
FIG 10
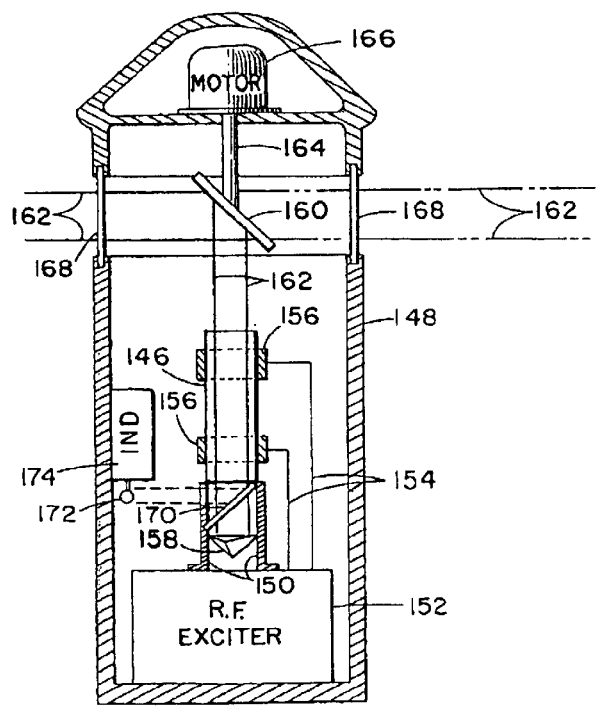
FIG 9
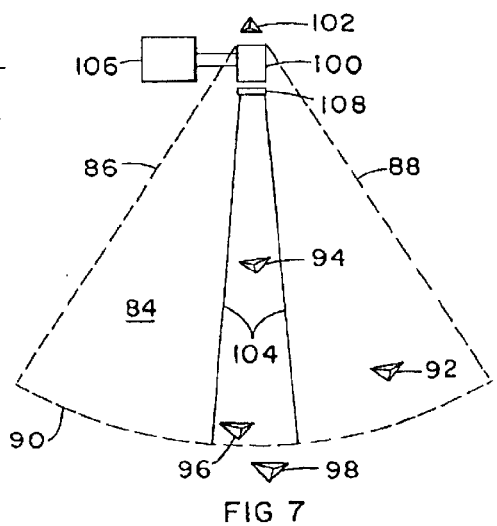
FIG 7

LASER METHOD AND APPARATUS

This application is a continuation-in-part of my application, Ser. No. 04/474,207, filed Jul. 16, 1965, and now abandoned.

This invention relates to methods and apparatus for transmitting radiation and is specifically directed to methods and apparatus for transmitting radiation by oscillating radiation from stimulated emission, such as lasers, masers, and the like.

As is well known, many substances may be caused to emit electromagnetic radiation by means of excitation of the electrons of the atoms of such substances. This phenomenon is referred to as "fluorescence"; and such excitation may be accomplished by various techniques, such as radio frequency stimulation or "pumping." Moreover, it has been found that several states or levels of excitation exist for the electrons of any atom and that transition of any electron between any given pair of such energy levels may result in emission of electromagnetic radiation having a frequency which is characteristic of the specific energy states of the specific atom in which the transition occurs. Many factors determine the specific energy states which will be established by the electrons of a given atom and, since any body of material contains vast numbers of atoms, excitation of such a body of material will generally result in the establishment of a substantial variety of energy states in respective atoms of the body of material. Consequently, a curve representing the electromagnetic radiation resulting from such excitation of any given substance will generally include a considerable number of peaks corresponding to radiation of different frequencies, each peak representing radiation of a respective frequency which is characteristic of a respective energy state of the excited atom. Such a curve is called the "fluorescence spectrum" for the excited element.

As described above, each peak of the fluorescence spectrum corresponds to radiation of a particular frequency emitted as a result of electron transition between respective energy states of a given atom. However, it must be understood that the atoms in any body of material are constantly in motion, due to such causes as thermal agitation, and this motion is random in nature. Consequently, Doppler shift will cause some spread between the actual frequency of the radiation and the observed frequency. Numerous other effects cause similar spreading of the observed frequency. As a result, each observed peak of a fluorescence spectrum will have a continuous frequency band of significant width, with the intensity of the radiation varying within the band width.

It has further been discovered that, by placing two plane, parallel reflective members, such as mirrors, on opposite sides of a body of material and orienting the mirrors to receive radiation from the body and to redirect the radiation through the body to each other, if the mirrors are spaced apart a distance which is a multiple of one half of the wavelength of the radiation having a frequency within the band width of a peak of the fluorescence spectrum of the material, the radiation oscillates between the two mirrors and will tend to cause each of the atoms of the body of material to obtain the particular energy state which will produce radiation of the particular frequency determined by the mirror spacing. This phenomenon is referred to as amplification by stimulated emission of radiation and has been demonstrated by masers, at microwave frequencies, and lasers, at optical frequencies.

It has been found that, by using this phenomenon, extremely high energy levels can be developed within the resonant cavity formed by the two mirrors. Moreover, if one of the mirrors is made partially transparent, some of this energy will be emitted in the form of a coherent beam of electromagnetic radiation. Thus, the energy of the beam can be employed for useful purposes. Because this energy is in the form of electromagnetic radiation it can be focused, by lenses and the like, to concentrate the energy into small areas for such uses as cutting and welding metals. At the same time, it has been found that, due to the coherent nature of the beam, the energy can be transmitted, substantially without loss, over long distances. Thus, such devices have been proposed for use in communications, for supplying power to space vehicles, and for innumerable other exotic uses.

Unfortunately, there have been several serious disadvantages to the prior-art devices of this type. To obtain oscillation between a pair of reflectors forming a resonant cavity, as described previously, the mirrors must be spaced apart a distance which is a precise multiple of one half of the wavelength of the radiation corresponding to the frequency within the band width of a peak of the fluorescence spectrum for which oscillation is sought. On the other hand, the wavelength of electromagnetic radiation is inversely related to the frequency and, at optical frequencies, the wavelengths are of the order of $10^{-8}$ centimeters. Consequently, the positioning of the mirrors to obtain oscillation at a specific frequency is an extremely delicate procedure. The vast majority of previous research relating to lasers has been directed to developing methods and apparatus for improving the accuracy with which the various specific frequencies within a peak can be resolved to obtain more truly monochromatic radiation.

It is known that the number of frequencies of the radiation within the band width at which oscillation of the radiation may occur is directly related to the length of the resonant cavity, that is, the spacing between the mirrors. Thus, much of the previously effected research has been directed toward making the resonant cavity as short as possible to reduce the number of possible oscillation frequencies. Furthermore, it has been found that the parallelism of the mirrors of the resonant cavity is extremely critical. Thus, even with confocal, spherical mirrors, deviations from the optimum relative positions of the mirrors of only a few minutes of arc may prevent oscillation.

Another disadvantage of the prior art devices has been the fact that, although tremendous power is developed by the oscillating radiation contained within the resonant cavity, the only power which has been available for use has been that which was drawn off by such techniques as making one of the mirrors of the resonant cavity partially transparent to allow some of the radiation to escape. However, when this is done, the optical elements of the resonant cavity must be capable of withstanding a power level which is much greater than the power level available in the escaped beam. Consequently, much research has been done toward developing optical elements capable of withstanding higher power levels.

An additional disadvantage of the prior art has been the fact that, because of the coherent nature of the beam, the beam width is very narrow and is spread substantially only by aperture diffraction. Thus, a typical laser beam might have a divergence angle of only about one arc second. While this is satisfactory for such purposes as communication between two fixed points, it provides serious aiming problems in situations where it is desired to transmit radiation to or from a moving object, such as a space vehicle.

These disadvantages of the prior art are overcome with the present invention, and novel methods and apparatus are provided whereby the power level required within the resonant cavity is greatly reduced. Accordingly, the power-handling capabilities of the optical components of the resonant cavity may be similarly reduces. In addition, the present invention makes it possible to initiate and maintain oscillation of stimulated radiation even where there is substantial disalignment of the reflective members of the resonant cavity.

The advantages of the present invention are preferably attained by providing methods and apparatus for obtaining oscillation of stimulated radiation which does not require precise positioning of the mirrors with respect to one another. As indicated above, the number of possible oscillation frequencies is directly related to the length of the resonant cavity. In accordance with the present invention, the mirrors are spaced a relatively long distance apart so that oscillation of stimulated radiation can be maintained at frequencies thereof which lie within a continuous range of the band width of the peak of the fluorescence spectrum and in regions of intensity of the radiation within the peak having a critical or threshold value. The frequencies of oscillation of the stimulated radiation are thus determined by the characteristics of the fluorescence peak of the body of excitable material and are substantially independent of changes in the length of the resonant cavity. Moreover, it has been found that a first reflective member positioned to receive radiation from a body of excitable material and to redirect said radiation through the body cooperates with the body of excitable material to define a field of view; and oscillation of radiation can be initiated and maintained between the first reflective member and a second reflective member located anywhere within the field of view and spaced from the body a distance such that the area of the second reflective member is less than that of the field of view at the second reflective member if the second reflective member is oriented to receive radiation from the body and to redirect the radiation through the body to the first reflective member. Furthermore, within these limitations, the second reflective member may be freely movable through six degrees of freedom anywhere within said field of view.

Accordingly, it is an object of the present invention to provide improved methods and apparatus for transmitting radiation.

An additional object of the present invention is to provide methods and apparatus for initiating and maintaining oscillation of stimulated radiation even where there is substantial disalignment of the reflective members forming the resonant cavity.

A specific object of the present invention is to provide methods and apparatus for transmitting radiation wherein the reflective members forming the resonant cavity are spaced apart a distance such that frequency of oscillation of the stimulated radiation is determined by the fluorescence peak of the body of excitable material and is substantially independent of changes in the length of the resonant cavity.

Another specific object of the present invention is to provide methods and apparatus for transmitting radiation comprising a first reflective member positioned to receive radiation from a body of excitable material and to redirect the radiation through the body, the first member cooperating with the body to define a field of view within which oscillation of stimulated radiation can be initiated between the first reflective member and a second reflective member located anywhere within the field of view and spaced from said body a distance such that the reflective area of the second member is less than that of the field of view at the second member, when the second member is oriented to receive radiation from the body and to redirect the radiation through the body to the first member.

These and other objects and features of the present invention will be apparent from the following detailed description, taken with reference to the figures of the accompanying drawing.

In the drawing:

FIG. 1 is a diagrammatic representation of a typical laser configuration of the prior art;

FIG. 2 is a graph showing a curve representing one peak of the fluorescence spectrum for a typical element and the oscillation frequencies within the peak that can be supported by a short resonant cavity;

FIG. 3 is a graph, similar to that of FIG. 2, showing the oscillation frequencies that can be supported by a long resonant cavity;

FIG. 4 is a diagrammatic representation of a laser configuration embodying the present invention;

FIG. 5 is a diagrammatic representation of a modified form of the apparatus of FIG. 4;

FIG. 6 is a diagrammatic representation showing use of the apparatus of FIG. 5 to establish oscillation of stimulated radiation with a reflective target having an area less than that of the field of view of the apparatus of FIG. 5 at the target;

FIG. 7 is a diagrammatic representation showing use of the apparatus of FIG. 5 to detect a reflective target located within a given surveillance area;

FIG. 8 is a diagrammatic representation of a portable device embodying the invention;

FIG. 9 is a diagrammatic representation of a modified form of the device of FIG. 8; and FIG. 10 is a diagrammatic representation of a communication system embodying the present invention.

As described above, and shown in FIG. 1, lasers comprise a body 2 of material, such as a glass tube containing a mixture of neon and helium gases, which can be excited by suitable means, such as a radio frequency exciter 4 coupled to apply energy to the body 2, as by electrodes 6. In the prior art devices, a pair of plane, parallel mirrors 8 and 10 are positioned on opposite sides of the body 2 and are oriented in planes perpendicular to the axis of the body 2. The mirrors 8 and 10 are spaced a part a distance which is some precise multiple of one half the wavelength of radiation having a particular frequency within a peak of the fluorescence spectrum of the material of body 2 for which oscillation is desired.

FIG. 2 represents a peak of the fluorescence spectrum of a typical element. As shown therein and described above, a peak of the fluorescence spectrum of any element may be represented by a curve 12. However, peak 12 is actually the envelope including all of the frequencies resulting from variations of the actual frequency of the radiation caused by Doppler shift and other effects. Moreover, as discussed above, because the wavelengths of radiation at optical frequencies are so short, it has been found that the potential frequencies of the radiation at which oscillation may occur are restricted to the resonance frequencies of the cavity, as shown by curves 14. Furthermore, oscillation can occur only at those resonant frequencies of the short-length cavity within the portion of the peak 12 for which the amplification exceeds the losses within the cavity, as indicated by the portion of the peak 12 above the threshold value represented by the dashed line 16.

When the exciter 4 of FIG. 1 is turned on, the body 2 will be excited to fluorescence and, initially, will emit radiation at all of the frequencies within a peak of its fluorescence spectrum, as indicated by curve 12 of FIG. 2. However, oscillation of the emitted radiation will occur only at those frequencies of the peak 12 having intensities which exceed the threshold value 16 and are at the cavity resonant frequencies 14A, 14B, and 14C, the length of the cavity being a multiple of the half wavelengths of the radiation at these frequencies. During the oscillation of the radiation of these frequencies between the mirrors 8 and 10 and through the body 2, radiation is amplified in the well known manner. To make this amplified radiation available for use, various well known optical techniques may be employed. For example, mirror 10 of FIG. 1 may be made to reflect 90% of the radiation incident thereon and to allow 10% of the radiation to pass through in a beam, as indicated by dashed lines 20. This beam 20 may then be focused, as by lens 22, to concentrate the energy of beam 20 into a small area, as indicated at 24, or it may be employed in various other ways.

In the apparatus embodying the present invention, indicated generally at 26 in FIG. 4, the length of the resonant cavity between the reflectors, shown at 34 and 36 in FIG. 4, is so great that the resonance frequencies of the cavity lie with a substantially continuous range, as shown by curve 28 of FIG. 3 and oscillation of the radiation emitted by the body 44 of FIG. 4, at the initiation of its excitation by the exciter 52, will occur at any one or more of the frequencies of the spectrum peak 12 having intensities exceeding the threshold value, indicated by line 16 in FIG. 3. It can be shown that this condition is obtained when the spacing between the reflectors 34 and 36 is greater than twice the square root of the ratio of the aperture area of the smaller of the reflectors to the solid angle of the beam issuing therefrom. As this oscillation of the radiation between the reflectors 34 and 36 and through the body 44 continues, the range of frequency of the oscillating radiation narrows, due to the inherent properties of the apparatus, until a coherent beam of oscillating radiation of substantially single or monochromatic frequency is obtained, as seen at 30 in FIG. 3. This oscillation of radiation of monochromatic frequency, once established, will continue even though the length of the resonant cavity may change, as by movement of one reflector, for example, reflector 36 of FIG. 4, toward or away from the other reflector 34.

FIG. 4 is a diagrammatic representation of apparatus, embodying the present invention, for transmitting radiation between two remote locations. As shown, a first retro-reflective member, such as cube corner reflector 34 having three mutually perpendicular, planar reflective surfaces, is located at one of the two locations; and a second retro-reflective member, indicated at 36, is located at the other of the two locations. By way of example, the second retro-reflective member 36 is shown as a convex lens 38 having a plane mirror 40 fixedly mounted, by suitable means such as bracket 42, to be coextensive with the focal plane of the lens 38. It can be shown that the lens-mirror combination 36 is the optical equivalent of a cube corner reflector and functions as a retro-reflective member. It should also be understood that a second cube corner reflector, similar to reflector 34, could be substituted for the lens-mirror combination 36 or that a second lens-mirror combination, similar to lens-mirror combination 36, could be substitued for the cube reflector 34. A body 44 of excitable material is disposed between the retro-reflective members 34 and 36, and the retro-reflective members are oriented to receive radiation from the body 44 and to re-direct said radiation through the body 44 to each other, as indicated by beam path 46. Conventional exciting means, such as radio frequency exciter 52, may be employed to excite the body 44 to fluorescence. When this is done, the atoms of the body 44 are excited and emit radiation at frequencies and intensities represented by the peak of a fluorescence curve for the elements forming the body 44, as indicated by curve 12 of FIGS. 2 and 3. Within the beam path 46, all radiation emitted by the body 44 toward retro-reflective member 34 in directions parallel to the beam path 46 will be received by retro-reflective member 34 and will be re-directed to pass through body 44 to retro-reflective member 36 and, thence, will be returned through body 44 to retro-reflective member 34. Thus, oscillation of radiation is established within the resonant cavity formed by the retro-reflective members 34 and 36. Moreover, by spacing the reflective members 34 and 36 sufficiently far apart, the frequency of the oscillating radiation within the beam path 46 is determined by the peak of the fluorescence spectrum of the body 44 and will be substantially independent of changes in the distance between the reflective members 34 and 36.

Following these teachings, it is possible to provide a resonant cavity of substantially any desired length. Moreover, the length of the resonant cavity may be varied, even during operation of the device, without interfering with the oscillation of the radiation. Thus, for example, if reflector 34 and excitable body 44 are located on Earth and reflector 36 is carried by a space vehicle, oscillating radiation can be established and maintained therebetween to transmit radiation between Earth and the space vehicle, or vice versa. In such an arrangement, the length of the resonant cavity is the distance from the location of reflector 34, on Earth, to the reflector 36, carried by the space vehicle. There are numerous advantages which are obtained by such an arrangement. One of the most important advantages arises from the fact that, as described above, the tremendous power obtainable in laser-type devices is developed by the oscillation of radiation through the body of excitable material within the resonant cavity. Thus, if it is desired to transmit power from Earth to the space vehicle, the technique of the present invention permits power developed in the resonant cavity to be transmitted therefrom to the space vehicle with substantially no transmission loss.

An additional advantage of the apparatus of the present invention, due both to the great length of its resonant cavity and the use of retro-reflective members for forming the resonant cavity, is extraordinary flexibility of operation. Thus, the reflective members forming the resonant cavity can be freely moved, through substantial ranges with six degrees of freedom, without interrupting the oscillation of the radiation therebetween and without substantially varying the intensity or frequency of the oscillating radiation. Moreover, it should be noted that this flexibility of spacing is independent of whether the reflective members of the resonant cavity are retro-reflective means or plane, parallel mirrors.

The apparatus 50, illustrated in FIG. 5, includes a pair of retro-reflective members 54 and 56 spaced apart to form a resonant cavity within which is located a body 58 of material that is excitable to emit radiation. For purposes of clarity, no exciting means is shown for the body 58. However, it should be understood that the body 58 may be excited by conventional exciting means, such as the radio frequency exciter 52 of FIG. 4.

The body 58 of excitable material may be of substantially any desired configuration, and radiation, resulting from stimulation of the body 58 to fluoresce, will be emitted in all directions. However, oscillation will occur only for that radiation which is emitted by body 58, received by retro-reflector 54, redirected to pass through body 58 to retro-reflector 56, and redirected by retro-reflector 56 to pass through body 58 to retro-reflector 54, or which travels over the same path in a reverse direction. Such a beam of oscillating radiation is represented, in FIG. 5, by the shaded area 60. At the same time, where the length of the resonant cavity is long, as taught by the present invention, it is found that each of the retro-reflective members 54 and 56, forming the resonant cavity, cooperates optically with the body 58 to define a respective field of view within which the other of the reflective members is freely movable through substantial ranges with six degrees of freedom.

In optical systems, the term "stop" is a diaphragm, lens mounting, or some other obstacle which limits the rays that can be transmitted through the system. The area, defined by the stop, through which the rays can pass, is referred to as an "aperture," and the aperture through which the rays pass out of the system is called an "exit aperture." As indicated previously, each of the retro-reflective members 54 and 56 cooperates with the body 58 to define a respective field of view, within which the other reflective member is movable. However, for purposes of explanation, only the field of view for retro-reflective member 54 will be described.

In the preceeding paragraph, the term "exit aperture" was broadly defined. However, when the body 58 becomes fluorescent, radiation passes out of the body 58 in all directions. Thus, any portion of the surface of body 58 would meet the broad definition of an exit aperture. Hence, it is necessary to employ a more restricted definition. As described previously, oscillation occurs when radiation emitted by the body 58 is reflected by a retro-reflector 54 or 56 to re-pass through the body 58 to the other retro-reflector 54 or 56. Thus, as seen in FIG. 5, radiation from body 58 passes out through end surface 62 of body 58, is reflected by retro-reflector 54, passes into body 58 through end surface 62, travels through body 58, and passes out through end surface 64 toward retro-reflector 56. Consequently, end surface 64, which is disposed oppositely on body 58 from retro-reflector 54, is the exit aperture for the optical system consisting of reflector 54 and body 58. Similarly, end surface 62 is the exit aperture for the optical system consisting of body 58 and retro-reflector 56. On the other hand, unless the surface of the exit aperature is perpendicular to the optic axis of the optical system, refraction and other optical effects may act to alter the ray path. The influences of such effects can be calculated and serve to define an "effective exit aperture," as indicated by dashed line 66. The calculations required for determining the area of the effective exit aperture are well known to anyone working in optical fields.

Considering reflector 54 and body 58 as an optical system, the effective exit aperture has been defined, in the foregoing paragraph, and is represented by dashed line 66 in FIG. 5. The "field of view" of this optical system may, then, be described as being substantially equal to the solid angle defined by the length of a line, represented by dashed line 68, joining the optic center of reflector 54 with the center of the effective exit aperture 66 of the body 58 divided into the area of the effective exit aperture 66 perpendicular to the line 68. Thus, the field of view for the optical system consisting of reflector 54 and body 58 is equal to the solid angle represented by lines 70 in FIG. 5. It should be noted that the optic center of a retro-reflective member is that point about which the retro-reflective member may be pivoted without altering the path over which an incident ray is returned to its source. For a cube corner reflector, such as reflector 54, the optic center is the apex, as indicated at 72 in FIG. 5. For the lens-mirror device, such as reflector 36 of FIG. 4, the optic center is the center of the lens, as indicated at 74.

As indicated previously, the use of retro-reflective members, which have the property of reflecting radiation incident thereon in directions opposite and parallel to the path of incidence even when the path of incidence is not parallel to the optic axis thereof, permits the reflective members forming the resonant cavity to be freely movable through substantial ranges with six degrees of freedom. Thus, referring to FIG. 5, first retro-reflective member 54 and the body 58 of excitable material cooperate to define a field of view substantially equal to the solid angle represented by lines 70. It is found that oscillation of radiation can be established and maintained between the first retro-reflective member 54 and a second reflective member, such as reflector 56, located anywhere within the field of view 70 and oriented to receive radiation from body 58 and to redirect said radiation through body 58 to reflector 54. It will be seen that this permits substantial lateral, vertical, and axial rotational movement of the second reflector 56, regardless of whether the second reflector is a plane mirror or a retro-reflective member. Experimentally, where both reflectors were retro-reflective members and the resonant cavity length was 10 meters, canting of the second reflector by as much as thirty degrees and transverse movements of about 10 centimeters did not interfere with oscillation. Such displacement without interruption of operation is unheard of in the prior art. Obviously, as the spacing between the reflectors 54 and 56, is increased, without change of the relationship between reflector 54 and body 58, the area included in the field of view 70 increases. Thus, the greater the range between the reflectors 54 and 56, the greater is the range through which the second reflector 56 can be moved without interfering with oscillation. Thus, oscillation may be established-and maintained, even where the second reflector 56 is in motion or has its optic axis substantially disaligned from that of the system comprising reflector 54 and body 58. Consequently, the aiming problems of prior art laser-type devices are greatly reduced with the present invention.

To further reduce the aiming problems, the concept of the present invention is uniquely advantageous in establishing and maintaining oscillation between a pair of reflective members which are spaced apart a distance such that the reflective area of the second reflector is small compared to the field of view of the optical system comprising the first reflector and the body of excitable material. Thus, in FIG. 6, the pyramidal volume 76 represents the field of view of an optical system represented by block 78 and comprising a first reflective member and a body of excitable material, such as reflector 54 and body 58 of FIG. 5. The circle 80, in FIG. 6, represents a target reflector with which oscillation of radiation is to be established and maintained. It is assumed that the location of the reflective target 80 is unknown but that the target 80 is oriented to receive radiation from the body of excitable material of the optical system 78 and to redirect said radiation through the body to the first reflector of the optical system 78. In order to obtain a relatively large field of view, it is preferable to position the reflector 54 close to the surface 62 of the body 58.

With a conventional laser-type device, such as that of FIG. 1, the beam 20 is coherent and is subject only to very slight divergence with range. Such a coherent beam is represented in FIG. 6 by the dashed line volume 82. Obviously, in order for a coherent beam, such as beam 82, to locate the reflective target 80, it would be necessary to provide some means for causing the beam 82 to scan in a manner such as that in which an electron beam scans the screen of a television tube, and some means to detect the radiation reflected from the target. However, such scanning is time-consuming and requires that the exciting means 4 of the device of FIG. 1 be operated continuously at a high output level in order to replace the energy drawn off to produce the beam, seen at 20 in FIG. 1 and at 82 in FIG. 6, during the scanning operation. In contrast, with the present invention, target acquisition is virtually instantaneous and the requirements placed on the exciting means are greatly reduced. As indicated above, volume 76 represents the field of view of an optical system, indicated at 78, comprising a retro-reflective member and a body of excitable material, such as reflector 54 and body 58 of FIG. 5. When the body 58 is excited to fluorescence, the volume 76 is flooded with radiation. However, oscillation is established only for that radiation which is incident on the target 80 and reflected by the target to the optical system 78 so as to re-pass through the body of excitable material to the retro-reflective member of the optical system 78. Thus, as seen in FIG. 5, oscillation is established only for the beam, represented by shaded area 60, between the reflective members 54 and 56, whereas no oscillation occurs in the areas on either side of the beam 60 yet within the lines 70, representing the edges of the field of view. Consequently, it will be seen that, in accordance with the present invention, oscillation is established, substantially at the speed of light, between the optical system 78 of FIG. 6 and a reflective target 80 located anywhere within the field of view 76. Furthermore, the reflective target 80 forms one end of the resonant cavity, as can be seen if reflective member 56 of FIG. 5 is considered as a target. Thus, it will be understood that the radiation reflected by the target 80 of FIG. 6 or reflector 56 of FIG. 5, so as to re-pass through the body of excitable material, seen at 58 in FIG. 5, produces stimulated emission of radiation in the body 58 which contributes to the establishment and maintenance of oscillation of radiation. Because of this, the body 58 may be excited to an energy level which is high enough to cause fluorescence but is below the threshold for oscillation. Thereafter, the energy added by the radiation reflected from the target serves to establish and maintain oscillation. Therefore, the present invention reduces the aiming problems of the prior art and, at the same time, greatly reduces the power required from the exciting means.

In the discussion of FIG. 6, it was assumed that the target 80 was located somewhere within the field of view 76. However, the present invention is also useful in locating reflective targets on a broader scale. Thus, it may be desired to be able to detect the presence of a reflective target within a predetermined surveillance volume and to transmit radiation to such target. In FIG. 7, a predetermined surveillance volume indicated generally at 84 is defined by dashed line 86, 88, and 90. A plurality of reflective targets 92, 94, 96 and 98 are distributed about the surveillance volume 84. A body 100 of excitable material is disposed adjacent the surveillance volume 84 and a retro-reflective member 102 is positioned to cooperate with the body 100 to define a field of view, indicated by lines 104, directed into the surveillance volume 84. Suitable means 106 are provided for exciting body 100 and may be similar to the radio frequency exciter 52 of FIG. 4.

As described with respect to FIGS. 5 and 6, any of the reflective targets 92, 94, 96 and 98 can cooperate with retro-reflective member 102 to form a resonant cavity to permit oscillation of radiation therebetween. The exciting means 106 must be capable of exciting the body 100 to an energy level substantially equal to the threshold for establishing oscillation of stimulated radiation between the retro-reflective member 102 and a reflective target, such as target 96 located at the maximum range, represented by line 90. The maximum range 90 is determined by the gain of the body 100, and this gain is determined by the size, shape, and composition of body 100 and the energy of the exciting means 106. It will be apparent that the gain of body 100 must be sufficient to overcome energy losses occurring within retro-reflector 102, body 100 and target 96, plus the transmission losses encountered by the radiation in passing from body 100 to target 96 and back to the body 100. If desired, suitable means, such as lens 108, may be provided to alter the field of view 104 and range 90.

It will be seen that, in FIG. 7, as with the device of FIG. 5, oscillation of radiation cannot occur unless a reflective target is present within the surveillance volume 84 and is oriented to recieve radiation from the body 100 and to reflect the radiation through the body 100 to reflector 102. As described previously, this is true because the target forms one end of the resonant cavity. When a target, such as target 94 or 96, is within the field of view 104, oscillation will occur. Target 92 is within the surveillance volume 84, but would not be detected since it is located outside of the field of view 104. However, target 92 could be detected by aiming the field of view 104 so as to include target 92 or by causing the field of view 104 to scan the surveillance volume 84. Means for accomplishing this are disclosed in FIGS. 8 and 9. Target 98 would not be detected since it is outside the surveillance volume 84. However, target 98 would be detected if it were to move into the surveillance volume 84, or if the gain of body 100 were increased.

FIG. 8 illustrates a portable device for use in the manner described with respect to FIG. 7. As seen, the device comprises an open-ended housing 110 within which is mounted a tube 112 containing a mixture of gases, such as neon and helium, which are excitable to emit radiation. A suitable radio frequency exciter 114 is provided and, as shown, may be carried by shoulder straps 116 or the like. A pair of electrodes 118 and 120 are mounted adjacent tube 112 within housing 110 and electrode 118 is connected by lead 122 to exciter 114, while electrode 120 is connected by lead 124, a trigger-controlled switch 126, and lead 128 to the exciter 114. A cube corner reflector 130 is mounted within the housing 110 and is positioned to receive radiation emitted from tube 112 and to reflect said radiation through tube 112 to provide a field of view, indicated by dashed lines 132. Sighting means 134 and 136 may be provided to facilitate aiming the device. The device may be employed for locating reflective targets, in the manner described with respect to FIG. 7, by closing the trigger switch 126 to cause fluorescence, and oscillation will occur when the radiation from the device is reflected back by the target. Moreover, when a target is located, the device may be employed for signalling by actuating the trigger switch 126 appropriately, or to transmit radiation to the target for various other purposes. To indicate when a target has been located, a partially transparent mirror 138 is, for example, positioned between the tube 112 and reflector 130 to direct a portion of the radiation passing therebetween to a photocell 140, or the like. Photocell 140 is connected by lead 142 to suitable indicating means 144 which may provide a visible, audible or other desired indication.

FIG. 9 illustrates a device, similar to that of FIG. 8, but including means for causing the field of view to scan a surveillance volume in the manner described above with respect to FIG. 7. In this form of the invention, a gas-filled tube 146 is mounted vertically within a housing 148 and is supported by suitable brackets 150 above a radio frequency exciter 152. The exciter 152 is connected by leads 154 to electrodes 156 which are mounted to supply excitation energy to the gas contained in the tube 146. A cube corner reflector 158 is mounted below the tube 146 and is oriented to receive radiation from the tube 146 and to redirect the radiation through tube 146, as indicated by beam 162, to an inclined mirror 160. The mirror 160 is carried by a shaft 164 which is rotatable by motor 166 or the like to cause beam 162 to scan a circle about the device. A transparent window 168 is provided in the housing 148 to permit passage of the beam 162. To indicate detection of a target, a partially transparent mirror 170 is mounted between the reflector 158 and tube 146 to direct a portion of the radiation passing therebetween to a photocell 172 which supplies a signal to a suitable detector 172 to cause indicator 174 to indicate that a target has been located.

FIG. 10 illustrates a system which responds to detection of a target by modulating the oscillating radiation for transmitting signals from Earth to a space vehicle or the like. In this form of the invention, a body 176 of excitable material is mounted at the Earth station and a radio frequency exciter 178 is connected by leads 180 and electrodes 182 to supply excitation energy to the body 176. A first retro-reflective member 184 is located adjacent the body 176 and oriented to receive radiation from the body 176 and to redirect said radiation through body 176 toward the space vehicle. A second retro-reflective member 186 is carried by the space vehicle and is oriented to receive radiation from body 176 and to redirect the radiation through body 176 to the first retro-reflective member 184. As described above, oscillation of radiation is established and maintained between the retro-reflective members 184 and 186. At the Earth station, a first partially transparent mirror 188 is positioned to direct a small portion of the oscillating radiation to a suitable detector 190 which supplies a signal to modulating circuit 192 to actuate suitable means 194, such as a Kerr cell shutter, to modulate the oscillating radiation to transmit information to the space vehicle. The modulating circuit 192 provides a variable potential to the Kerr cell shutter to vary the degree of transparency of the cell to the oscillating radiation. At the space vehicle, a second partially transparent mirror 196 directs a small portion of the oscillating radiation to a suitable detector 198 which demodulates the oscillating radiation and, hence, acts to receive the transmitted information. The system of FIG. 10 could, for example, be used to scan a predetermined surveillance volume, in the manner described with respect to FIG. 7, and, upon acquisition of a target, to transmit a recognition signal, or the like, to permit identification of friendly space vehicles.

It will be understood that the methods and apparatus described above are equally applicable to lasers, masers, and the like. Moreover, various types of exciting means, modulating means and detection or indicating means may be substituted for those disclosed. In addition, numerous other variations and modifications may, obviously, be made without departing from the present invention. Accordingly, it should be clearly understood that the forms of the present invention described above and shown in the figures of the accompanying drawing are illustrative only and are not intended to limit the scope of the invention.

What is claimed is:

1. A single-ended laser device for locating reflective targets within a given surveillance volume, said apparatus comprising:

a body of material excitable to emit electromagnetic radiation at frequencies within a characteristic fluorescence peak, said body having an effective exit aperture;

a single retro-reflective member having an optic center and positioned to receive radiation from said body and to redirect said radiation into said surveillance volume through said effective exit aperture of said body, said effective aperture being oppositely disposed on said body from said single member, said single member cooperating with said body to form a field of view within said surveillance volume substantially equal to the solid angle defined by the square of the length of a line joining said optic center of said single member with the center of said effective exit aperture divided into the area of said exit aperture transverse to said line;

means for exciting said body to an energy level substantially equal to the threshold for establishing oscillation of stimulated radiation between said single member and a reflective target located a preselected maximum distance from said single member to cause said body to broadcast fluorescent radiation throughout said field of view, whereby a resonant beam of stimulated radiation will be established between said single member and a reflective target located anywhere within said field of view at not more than said maximum distance greater than twice the square root of the ratio of the aperture area of at least one of said reflective members to the solid angle of the beam issuing from said one of said reflective members and which is oriented to receive radiation from said body and to redirect said radiation through said body to said single member; and means for indicating establishment of said resonant beam.

2. The apparatus of claim 1, further comprising means for causing said field of view to scan said surveillance volume.

3. The apparatus of claim 1, further comprising means responsive to occurrence of oscillation of stimulated radiation between said first member and said target for modulating said oscillating radiation.

4. The method comprising the steps of:

positioning a body of material adjacent to a surveillance volume, said material being excitable to emit electromagnetic radiation at frequencies within a characteristic fluorescence peak, said body having an effective exit aperture;

positioning a first retro-reflective member having an optic center so as to receive radiation from said body and to redirect said radiation through said body;

disposing said effective exit aperture oppositely on said body from said first member;

directing radiation reflected by said first member to pass through said effective exit aperture into said surveillance volume to form a field of view substantially equal to the square of the length of a line joining said optic center of said first member with the center of said effective exit aperture divided into the area of said effective exit aperture transverse to said line;

exciting said body to an energy level at least equal to the threshold for establishing oscillation of stimulated radiation between said first member and a reflective target located a preselected maximum distance from said first member to cause said body to broadcast fluorescent radiation throughout said field of view; and determining the presence of a reflective target located anywhere within said field of view at not more than said maximum distance and which is oriented to receive radiation from said body and to redirect said radiation through said body to said first member by establishing a resonant beam of stimulated radiation between said first member and said reflective target.

5. The method of claim 4, further comprising the step of causing said field of view to scan said surveillance area.

6. The method of claim 4, further comprising the step of indicating the occurrence of oscillation of stimulated radiation between said first member and said target.

7. The method of claim 4, further comprising the step of modulating said stimulated radiation in response to occurrence of oscillation of stimulated radiation between said first member and said target.

* * * * *